3,396,315
ELECTROLYTIC CAPACITOR
Jordan Stokes III, % M.E.C. Inc., 1204 Sudikum
Bldg., Nashville, Tenn. 37219
Filed Apr. 6, 1966, Ser. No. 540,752
4 Claims. (Cl. 317—230)

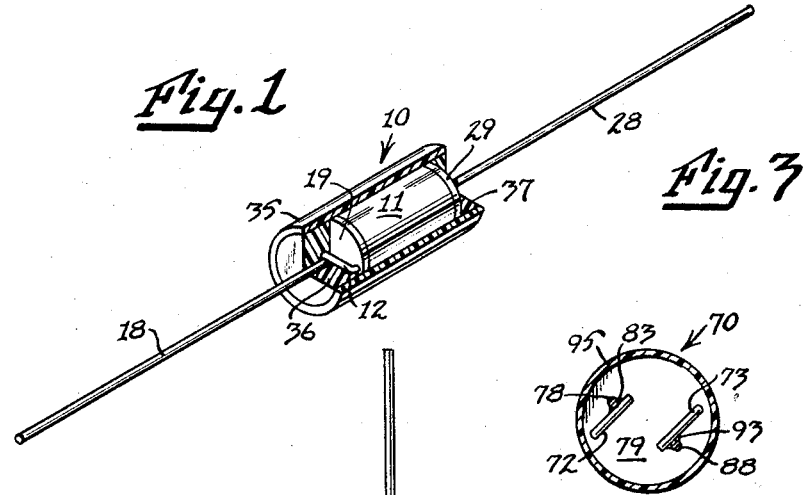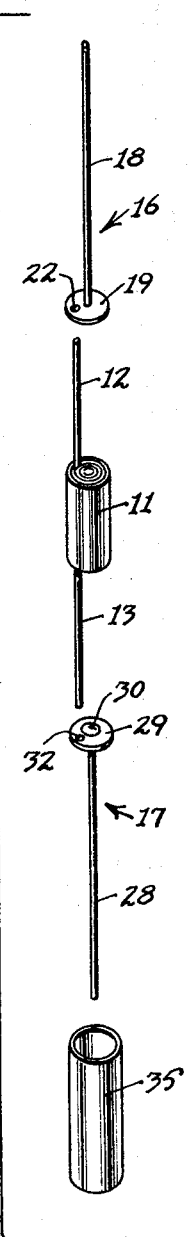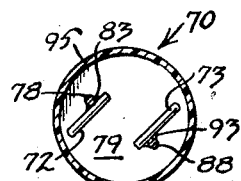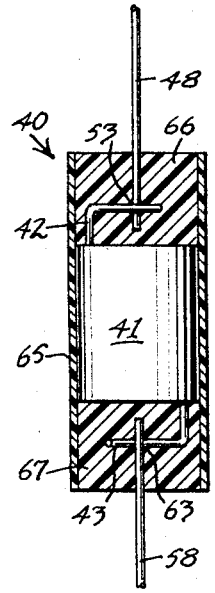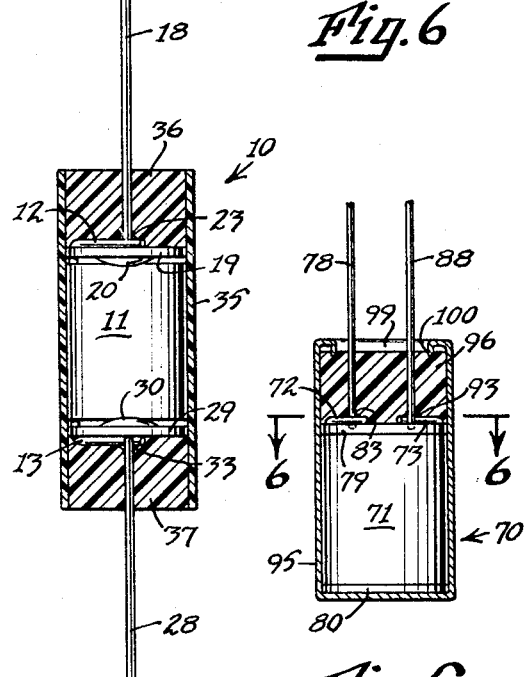

ABSTRACT OF THE DISCLOSURE

An electrolytic capacitor cartridge is disposed in an open ended case with an insulator supporting a lead in the end of the case. A terminal conductor extends from the cartridge through the insulator where it is connected to the lead and insulative compound fills the end of the case.

---

This invention relates to an electrolytic capacitor, and more particularly to a lead construction for an electrolytic capacitor.

In the conventional manufacture of an electrolytic capacitor, a capacitor cartridge is first formed of a plurality of alternating or interleaved layers of aluminum foil and paper wound into a roll, with wires or conductors extending from opposite ends, or the same end, of the cartridge and each conductor attached to a separate foil. The cartridge is then inserted within a tightly fitting, substantially cylindrical case with one or both ends open, depending on whether the conductors are extending from both ends or one end of the cartridge. A copper lead is then inserted into the case and welded or otherwise electrically connected to one of the conductors. The lead then must be held, usually manually, within the case, but away from the cartridge, while the surrounding space within the case is filled with a plastic insulating and sealing material, such as an epoxy resin. After the plastic material has set, the conductor, the electrical lead, and the connection between the two are fixed in place, and hopefully insulated from the end of the cartridge. There is of course, a separate lead for each conductor, and both leads must be held in place while the plastic sealing and insulating material is solidifying.

In situations where both conductors and leads extend to the same end of the case, the leads must also be properly spaced and supported so that they do not, and will not, contact each other, and thus short circuit the capacitor.

It is therefore an object of this invention to provide in an electrolytic capacitor a construction which will not only support a lead and a conductor while the insulating material is setting, but will also positively locate both the lead and the conductor in definite fixed positions.

Another object of this invention is to provide in an electrolytic capacitor, a lead construction which will provide a better seal for the cartridge.

A further object of this invention is to provide an electrolytic capacitor in which leakage and short circuits are minimized.

Another object of this invention is to provide an electrolytic capacitor having a more rigid construction, a longer life, and affording protection for the cartridge.

Another object of this invention is to provide an electrolytic capacitor having elements which may be more quickly, easily, and uniformly assembled.

Further objects and advantages of the invention will be apparent from the following description taken in conjunction with the drawings, wherein:

FIG. 1 is a perspective view of an electrolytic capacitor made in accordance with this invention and broken away to disclose the cartridge and lead construction;

FIG. 2 is an enlarged side elevation of the invention with the case and sealing material shown in section;

FIG. 3 is an exploded perspective view of the disassembled elements of the invention;

FIG. 4 is a view similar to FIG. 2, disclosing a prior art electrolytic capacitor;

FIG. 5 is a view similar to FIG. 2 showing a modification of the invention; and

FIG. 6 is a section taken along the line 6—6 of FIG. 5.

Referring now to the drawings in more detail, the electrolytic capacitor 10 made in accordance with this invention includes a cartridge 11 which is substantially cylindrical and constructed by rolling two sheets or strips of aluminum foil alternating with, or interleaved with, two sheets of insulating paper and immersed in an electrolytic solution to form the electrolytic capacitor elements. As shown in the drawings, an aluminum conductor 12 and another aluminum conductor 13 extends from opposite ends of the cartridge 11, each conductor being electrically connected, by soldering, fusing, or other means, to a separate foil sheet within the cartridge 11. The construction of the cartridge 11 and the conductors 12 and 13, thus far described, is conventional in the art of making electrolytic capacitors.

In this invention, as best disclosed in FIGURE 3, lead assemblies 16 and 17 are provided for the electrical conductors 12 and 13, respectively. The lead assembly 16 includes electrical lead 18, which may be made of tinned copper or tinned, copper-clad steel wire. The inner end of the lead 18 is fixed to an insulator member or wafer 19, preferably in the center thereof. The insulator member 19 may be made of any rigid insulating material which will bond to the sealing material, to be described later, and is a relatively thin disc having a diameter approximately equal to the diameter of the cartridge 11. The inner end of the lead 18 may extend through a hole in the center of the insulator disc 19 and be fused to the inside of the disc 19 by a fusible material 20, which will insulate the electrical lead 18 from the cartridge 11 when the insulator member 19 and the fusible material 20 are placed against the cartridge 11, as shown in FIGS. 1 and 2. It is within the scope of this invention to fix the inner end of the lead 18 within the insulator member 19, without extending the lead 18 entirely through the member 19. Thus, the insulator member 19 itself will insulate the lead 18 from the cartridge 11.

The insulator member 19 is also provided with a hole 22 large enough to receive the conductor 12. After the conductor 12 is passed through the hole 22, it is bent against the outside of the insulator member 19 and is electrically and mechanically connected at 23 to the lead 18, such as by welding.

In a similar manner, the lead assembly 17 includes a lead 28, insulator member or wafer 29, fusible insulating material 30 securing the inner end of the lead 28 to the insulator member 29, and a hole 32 to receive the conductor 13. Moreover, as shown in FIG. 2, the electrical conductor 13 is welded or otherwise electrically and mechanically connected at the point 33 to the lead 28.

After the lead assemblies 16 and 17 are connected to the cartridge 11 through the conductors 12 and 13, this subassembly is then inserted into a tubular or cylindrical case 35, which is longer than the cartridge 11 so that it will contain the insulated members 19 and 29 and the electrical connections 23 and 33, as well as the cartridge 11. Moreover, the inner diameter of the case 35 is approximately equal to the outer diameter of the cartridge 11 and to the outer diameters of the insulator discs 19 and 29, so that the discs 19 and 29 will have a tight slip-fit within the case 35 and will completely enclose the cartridge 11. The case 35 is preferably made of a phenolic resin or out of aluminum, adapted to protect the cartridge 11.

After the cartridge 11 and the lead assemblies 16 and 17 are assembled in the case 35, as shown in FIGS. 1 and 2, fluent plastic sealing materials 36 and 37 are poured into both ends of the case 35 to completely cover and seal the outsides of the insulator members 19 and 29 as well as the portions of the conductors 12 and 13 and the leads 18 and 28 between the outsides of the insulator members 19 and 29 and the outer ends of the case 35. Moreover, the sealing materials 36 and 37 completely cover the electrical connections 23 and 33. After the plastic sealing materials 36 and 37 have set, the leads 18 and 28 as well as the discs 19 and 29 and the cartridge 11 are rigidly locked in place.

The disc wafers 19 and 29 are also preferably made of phenolic, although they may be made of Bakelite or mica so long as they retain the characteristics of rigidity, insulation, and ability to bond with the plastic sealing materials 36 and 37. The plastic sealing materials 36 and 37 are preferably epoxy resin, or other material which will bond to the phenolic discs 19 and 29 as well as the inside of the phenolic case 35. Moreover, the sealing ability of the epoxy 36 and 37 will also prevent any leakage of the electrolyte from the cartridge 11 and will rigidly bond the leads 18 and 28 and the conductors 12 and 13 in place.

The discs or wafers 19 and 29 not only assist in rigidly sealing the cartridge 11 and the electrolyte within the case, but also provide a convenient means for accurately prelocating the leads 18 and 28, preferably in the center of the case 35, while the plastic sealing materials 36 and 37 are setting. Moreover, the holes 22 and 32 in the respective discs 19 and 29 also pre-locate the conductors 12 and 13. Furthermore, the holes 22 and 32 permit the conductors 12 and 13 to be mechanically as well as electrically attached to the leads 18 and 28 on the outsides of the discs 19 and 29, and thus mechanically and rigidly bind the leads 18 and 28 to the cartridge 11. It will be noted that this operation can be carried out prior to insertion of the sub-assembly of the cartridge 11 and the leads 16 and 17 into the case 35. When this sub-assembly is inserted into the case 35, all of the elements are pre-located and rigidly held in place, so that no additional support is required while the liquid epoxy is being introduced into the case 35, and while the epoxy is setting.

The fusible materials 20 and 30 fixing the inner ends of the leads 18 and 20 to their corresponding discs 19 and 29 may also be epoxy resin, if desired.

The merits of an electrolytic capacitor 10 made in accordance with this invention are readily observed when compared with the prior art electrolytic capacitor 40 disclosed in FIG. 4. In the capacitor 40, the conductors 42 and 43 of the cartridge 41 are electrically connected to the leads 48 and 58 at 53 and 63 by welding. However, the leads 48 and 58 must be held in position while the epoxy or other sealing material 66 and 67 are poured into the open opposite ends of the case 65. Therefore, extreme care and precise controls must be employed in the manufacture of electrolytic capacitors 40 so that the leads 48 and 58 will be properly located and so that the conductors 42 and 43 and the leads 48 and 58 are not permitted to contact the opposite ends of the cartridge 41 and create short circuits across the interleaved aluminum foils.

Another modification of the invention is disclosed in FIGS. 5 and 6, in which the capacitor 70 includes a cartridge 71 having both conductors 72 and 73 extend from one end. Each conductor 72 and 73 is connected to leads 78 and 88 by welding or otherwise to provide electrical connections 83 and 93, respectively, in the same manner as the construction of the capacitor 10, except that both leads 78 and 88 are fixed to a single insulator member 79. The disc 79 and the leads 78 and 88 are sealed and further secured within one end of the case 95 by the sealing material 96, the same as or similar to the sealing material 36.

It will be noted that the opposite end of the case 95 is closed.

FIG. 5 further illustrates another modification of this invention when the case 95 is made of a material having a different thermal co-efficient of expansion and different specific heat from those of the sealing material 96. Thus, assuming that the sealing material 96 is epoxy resin, and the case 95 is made of a metal, such as aluminum, when the capacitor 10 is subjected to excessive temperatures, such as in an overheated electrical circuit, both the aluminum case 95 and the resin 96 will expand. However, since the aluminum case 95 expands more than the resin 96, a crack or gap forms between the case 95 and the sealing material 96. As the heat is dissipated, the aluminum wall of the case 95 will cool more rapidly than the epoxy resin 96 causing the case wall to contract and squeeze the resin 96. However, since the aluminum case 95 cools first, the continued cooling of the resin 96 will cause the resin to continue to shrink after the contraction of the aluminum has ceased, again causing a slight separation between the wall of the case 95 and the resin 96.

In order to overcome this disparity in heating and cooling characteristics between the material 96 and the case 95, the open end of the case 95 is crimped into an inturned lip 99, substantially U-shaped, as disclosed in FIG. 5. It is important that the edge 100 of the lip 99 engage or extend slightly into the sealing material 96. Since the edge 100 is completely immersed on both sides by the sealing material 96 and the lip 99 is somewhat flexible, the edge 100 will expand and contract with the material 96 regardless of the inherent expansion or contraction of the metal in the wall of the case 95.

Of course, in capacitor 10 disclosed in FIGS. 1–3, the heat characteristics of the epoxy sealing material 36 and 37 and the phenolic wall of the case 35 are substantially the same, or at least the disparity is not great enough to create any separation between the sealing material 36 and 37 and the wall of the case 35.

Where the case 95 is made of aluminum or other conductive material, an insulator disc 80, or other type insulation, is placed between the bottom of the cartridge 71 and the bottom wall of the case 95, as disclosed in FIG. 5.

It will therefore be apparent to those skilled in the art that various changes may be made in the invention without departing from the spirit and scope thereof, and therefore the invention is not limited by that which is shown in the drawings and described in the specification, but only as indicated in the appended claims.

What is claimed is:

1. In an electrolytic capacitor having a case, a capacitor cartridge within said case, and an electrical conductor extending from one end of said cartridge, a lead construction comprising,
   (a) an electrical lead having an outer end and an inner end,
   (b) an insulator member having the same cross-sectional size and shape as the inside of said case,
   (c) said insulator member being fixed to said inner end and fitted within said case adjacent said cartridge so that said inner end is insulated from said cartridge,
   (d) said insulator member having an opening through which said conductor extends,
   (e) means for electrically connecting said conductor to said lead on the opposite side of said insulator member from said cartridge, and
   (f) means for sealing said insulator member within said case.

2. The invention according to claim 1 in which said insulator member is spaced from one end of said case, said means for electrically connecting the conductor and the lead is within said case, and said sealing means is an insulating material completely covering the outside of said insulator member and completely enclosing said conductor and said electrical connecting means.

3. The invention according to claim 2 in which said case is made of metal and has a different thermal coefficient of expansion from said sealing material, said one end of said case extending outwardly beyond said sealing material and forming an inturned, semi-flexible lip engaging the surface of said sealing material, said lip being adapted to move with said sealing material during the thermal expansion and contraction of said sealing material regardless of the expansion or contraction of said metal.

4. The invention according to claim 1 in which said insulator member is a relatively thin, substantially rigid wafer.

References Cited

UNITED STATES PATENTS

| | | | |
|---|---|---|---|
| 1,990,819 | 2/1935 | Danziger | 317—230 |
| 2,184,686 | 12/1939 | Deutschmann | 317—230 |
| 2,224,307 | 12/1940 | Linder | 317—230 |
| 2,970,182 | 1/1961 | Miquelis | 317—230 |

JAMES D. KALLAM, *Primary Examiner.*